Nov. 8, 1966  H. REICH  3,283,534

COUPLING DEVICE

Filed Aug. 20, 1964  2 Sheets-Sheet 1

United States Patent Office

3,283,534
Patented Nov. 8, 1966

3,283,534
COUPLING DEVICE
Herwarth Reich, Marthastr. 15, Bochum, Germany
Filed Aug. 20, 1964, Ser. No. 390,976
Claims priority, application Germany, Aug. 23, 1963,
R 35,966
8 Claims. (Cl. 64—11)

The invention relates to an improved type of elastic coupling for machine shafts and the like.

Most of the known elastic coupling use elastic intermediate members, which may for example be of rubber, for joining the coupling halves, U-shaped in cross-section and extending with arcuate shape from one coupling half to the other. Couplings of this type can compensate for comparatively large radial, axial and angular displacement of the coupling halves, with the desired amount of rotation elasticity. The great disadvantage of such couplings, however, and one which frequently makes their use impossible, is the arising of axial forces causing the coupling halves to approach each other, and these forces must be absorbed by the bearing of the machine shafts to be coupled together.

Several solutions are known which have the object of reducing or eliminating altogether the axial forces causing the coupling halves to approach one another, but this is always achieved at the expense of other advantages of the known couplings, as either the permissible displacements which the coupling is in a position to compensate are small, or the rotation elasticity of the coupling is not up to the desired standard, whereas with other known solutions the exchanging of the intermediate members is difficult, or indeed may only be possible when the machine shafts to be coupled are moved away from each other. Couplings which do not shown any axial approach forces between the coupling halves during operation through the transmitted moment of rotation and the centrifugal force of the intermediate members, i.e. what are known as couplings free from axial shearing, have intermediate members which are connected in a radial plane symmetrically on the one hand with a hub-shaped coupling half and, with a greater clamping sphere, with a drum-shaped coupling half.

A coupling of this type is known which has two circular intermediate members of S-shaped cross-section, in which the intermediate members are disposed in mirror-symmetry. The outer flanges are held in the drum-shaped coupling half by means of a clamp ring, whereas the inner flanges are held on both sides of a collar of the hub-shaped coupling half by means of clamp rings. With a coupling of this type, however, the exchanging of the intermediate members presents difficulties and is only to be carried out when the machine shafts to be coupled are moved from each other and the hub-shaped coupling half is taken off the shaft stump.

Another known coupling of this kind has flat intermediate members which are disposed spoke-like between the hub-shaped and the drum-shaped coupling halves. The separate intermediate members have strengthening inserts of threads wound in the form of an 8. Inside the thread coil highly elastic material is massed, which resiliently counters the stretching of the thread coils. By the massing of the elastic material inside the thread coils the intermediate members are made comparatively rigid as concerns axial and angular stress, so that axial and angular displacements of the shafts to be coupled allow undesirably high reaction forces to arise at the bearings of the shafts to be coupled. This arrangement can for example be seen in French patent specification 1,198,852.

The present invention refers to couplings of the above described type, free from axial shearing, in which the intermediate members are connected in a radial plane symmetrically on the one hand with a hub-shape and, with a greater clamping sphere, with a drum-shaped coupling half. The aim of the invention is to ensure the easy installing and dismantling of intermediate members, wherein these members can easily compensate for shaft alignment faults and wherein in operation of the coupling axial forces on the shafts to be coupled do not arise either by reason of the moment of rotation to be transmitted or as a result of the effect of centrifugal force.

In accordance with the invention, intermediate members of Y-shaped cross-section in an axial plane are proposed which are connected with their fork shanks with the hub-shaped coupling half and with their straight shank with the drum-shaped coupling half. These intermediate members after the loosening of the clamp rings joining them to the coupling halves, can, by tilting about the clamp point of a fork shank, be swung out of the drum-shaped coupling half and then dismantled and again installed in the reverse way, without the coupling halves having to be removed from each other.

An intermediate member in accordance with a further feature of the invention can be provided with strengthening inserts of less highly elastic material than the material of which the intermediate member per se is made which consists of two threads wound in the known way in the form of an 8, one indentation of the figures of 8 lying in each of the fork shanks, and the other indentations of the thread coils lying in the straight shank of the intermediate member. These thread coils take the traction stresses on the transmission of the moment of rotation, and are elastically supported in this by the mass of the intermediate member. The U-shaped cross-section of the intermediate member also being a decisive factor as far as concerns its elasticity.

The construction of the present coupling makes it possible in accordance with a further characteristic of the invention, for the insert of threads wound in the form of an 8 in the known way to surround with the indentations of their figure of 8 thread coils, parts such as cams, clamp bolts and the like, for the form-closed clamping of the intermediate members to the coupling halves.

In accordance with a further characteristic of the invention, each intermediate member can also be provided with an insert which strengthens it, and which is of less highly elastic material than is the material of the intermediate member per se, which insert in the known way consists of a thread coil which is conveyed through the clamp points and along the front ends of the fork shanks.

As strengthening inserts, in accordance with a further feature of the invention, also less highly elastic woven material can be placed along the outer sides of the shanks.

The coupling can compensate for faults in the alignment of the shafts and axial shaft displacement, in that in a further feature of the invention the fork shanks of the intermediate members together have a U-shaped cross section.

The invention will now be described with reference to the attached drawings, which show embodiments of the invention, but in no restrictive sense.

Figure 2:
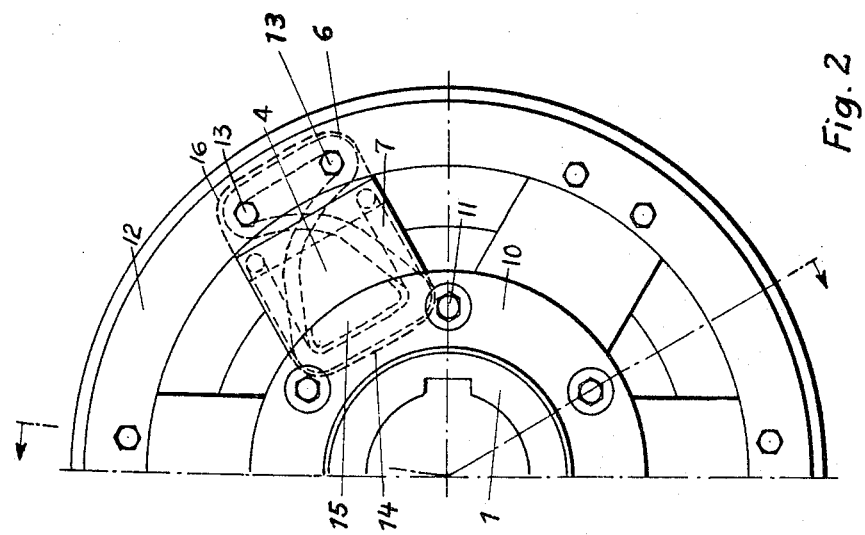
FIGURE 2 is a fragmentary front view of the same embodiment of the invention.
Figure 1:
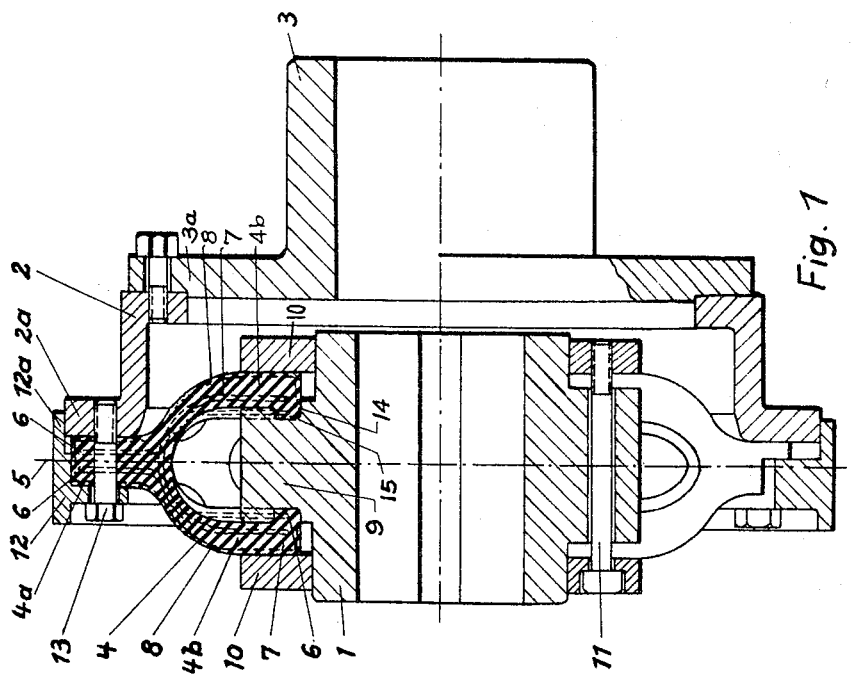
FIGURE 1 is a view of the coupling device of the invention, in section, along the line I—I of FIGURE 2.

In the embodiment in accordance with FIGURES 1 and 2, 1 designates a hub-shaped coupling half and 2 a drum-shaped coupling half. The drum-shaped coupling half 2 is here flanged to a hub 3 which has a flange 3a.

The two coupling halves 1 and 2 are joined together by a plurality of intermediate members 4, disposed symmetrically to a radial plane 5. The intermediate members are of Y-shaped cross-section in an axial plane, with a straight shank portion 4a and fork shaped portion 4b. The fork shaped portions 4b together have U-shaped cross-section. The intermediate members, which consist of highly elastic material such as rubber, have strengthening inserts of less highly elastic material. Accordingly, each intermediate member 4 has two inserts 6 of threads wound in the form of an 8, one insert 7 of threads in the form of a 0 and two woven inserts 8. The fork shaped portion 4b clamps around a packing ring 9 constructed as a collar on the hub-shaped coupling half 1 and are clamped between the ring and clamp rings 10 by means of clamp screws 11. The straight shank portions 4a are clamped to the drum-shaped coupling half 2 between the half and a clamp ring 12 by means of clamp screws 13. The packing ring 9 has, for form-closed joining with the intermediate members 4, recesses 14 in which cams 15 are disposed. The clamp ring 12 also has recesses 16 for the reception of the intermediate members 4. The drum-shaped coupling half 2 has a flange 2a against which the straight shank portions 4a of the intermediate members 4 are clamped by means of the clamp ring 12, so that the drum-shaped coupling half does not clamp round the shanks 4a of the intermediate members 4, thus facilitating considerably the installing and dismantling of the intermediate members 4. The clamp ring 12, on the other hand, is provided with a centering attachment 12a, in order to ensure the central seating of the clamp ring 12 in respect to the drum-shaped coupling half. The two inserts 6 of threads wound in the form of an 8 in each intermediate member 4 are disposed in the member 4 in such a way that each indentation of a thread coil lies in one of the fork shaped portions 4b and the thread coil thereby surrounds a cam 15 of the packing ring 9, the thread coils on the other hand surrounding the clamp screws 13 in the straight shank portion 4a. The initial purpose of these inserts 6 is to transmit the moment of rotation. The inserts 7 act as support for the inserts 6 and thereby strengthen the intermediate member 4, and are conveyed through the clamp points of the fork shaped portions 4b and along their front ends. The woven inserts 8 are also strengthening in effect and are conveyed along the shank outer sides of the intermediate members 4.

Figure 3:
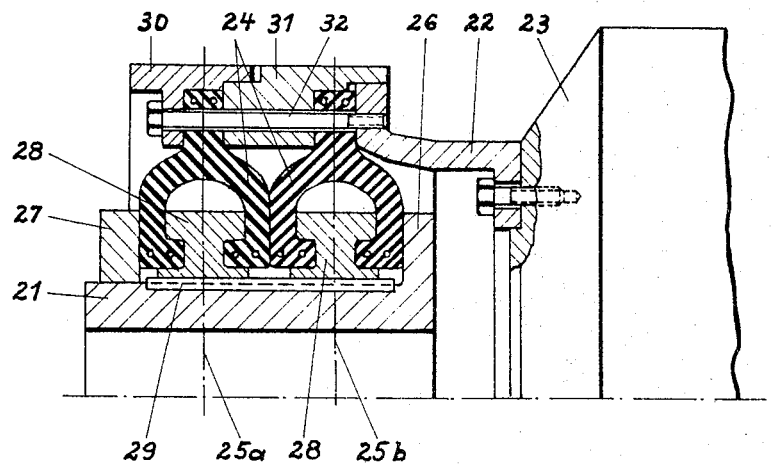
FIGURE 3 is a fragmentary section of a further embodiment.

In the embodiment of FIGURE 3 an example is given, in which the drum-shaped coupling half 22 is flanged onto a hydrodynamic coupling 23. For connecting the drum-shaped coupling half 22 with the hub-shaped coupling half 21, here intermediate members 24 are disposed in a plurality of radial planes 25a and 25b. With their fork shanks the intermediate members 24 are clamped between a clamp ring 26 formed as a collar on the hub-shaped coupling half 21 and a clamp ring 27, with the interposition of packing rings 28, the clamping being done by means of clamp screws (not shown). It will be noted that the packing rings 28 have a round bore and are seated upon the coupling half 21 so as to be easily displaceable. The clamping ring 27 and the packing rings 28 are axially movable and the rings 28 and coupling half 21 are provided with corresponding slots in which a key 29 is inserted to secure the packing rings 28 against rotation with respect to the coupling half 21. The straight shank portions of the intermediate members 24 are clamped, by means of the clamp screws 32, between the drum-shaped coupling half 22 and a clamp ring 30, with the interposition of a packing ring 31.

The invention is not restricted to the embodiments shown, and accordingly amendment is possible, in particular in relation to the shape of the coupling halves for their installation on the braking discs or other elements of the machines to be coupled together. The number of the intermediate members and their distribution in optionally more than two radial planes is also at the discretion of the experts. Again, amendments are possible in respect of the clamp rings and packing rings, and also their arrangement on the coupling halves, and these points are matters to be determined by the constructional form for the purpose for which the coupling is to be used.

I claim:
1. An elastic coupling comprising a hub-shaped half, a drum-shaped half, and intermediate members of highly elastic material for joining said halves and being connected to the halves in a symmetrical radial plane, each intermediate member being of Y-shaped cross-section in an axial plane thus providing a fork-shaped portion and a straight shank portion, means for connecting the fork-shaped portion to the hub-shaped half, and further means for connecting the straight shank to the drum-shaped half.

2. The elastic coupling as claimed in claim 1 including a strengthening insert of less highly elastic material for each intermediate member and such insert comprising threads formed to define an 8-shaped element with one looped part thereof lying in each leg of the fork-shaped portion and the other looped part lying in the straight shank portion.

3. The elastic coupling as claimed in claim 2 in which said looped parts encircle the means and further means for connecting the forked-shaped portion and the straight shank to the hub-shaped half and drum-shaped half, respectively.

4. The elastic coupling as claimed in claim 3 including a further strengthening insert of less highly elastic material for each intermediate member defined by a thread winding along the legs of the fork-shaped portion and the means and further means for connecting the fork-shaped portion and the straight shank to the hub-shaped half and drum-shaped half, respectively.

5. The elastic coupling as claimed in claim 4 in which the further insert is defined by a woven material.

6. The elastic coupling as claimed in claim 1 in which said fork-shaped portion is U-shaped viewed in cross-section.

7. The elastic coupling as claimed in claim 1 including an outturned peripheral flange on the drum-shaped half, a clamping ring coacting with the straight shank of the intermediate member and flange for constituting the further means for connecting the straight shank to the drum-shaped half, a collar on the hub-shaped half embraced by the legs of the fork-shaped portion and clamping rings operably related to the legs of the fork-shaped portion and collar constituting the means for connecting the fork-shaped portion to the hub-shaped half.

8. The elastic coupling as claimed in claim 1 including intermediate members arranged in at least two radial planes, and a packing ring bridging the space between the straight shanks of the intermediate members.

References Cited by the Examiner

UNITED STATES PATENTS

| 1,562,437 | 11/1925 | Clapham | 64—13 X |
| 3,074,254 | 1/1963 | Jones | 64—11 |

FOREIGN PATENTS 1,198,842   6/1959   France.

FRED C. MATTERN, Jr., *Primary Examiner.*

HALL C. COE, *Examiner.*